C. DICKIE, F. LAMBERT & R. STABLES.
SAFETY APPARATUS FOR SUPPORTING MINE CAGES OR THE LIKE.
APPLICATION FILED DEC. 9, 1911.
1,020,483.
Patented Mar. 19, 1912.
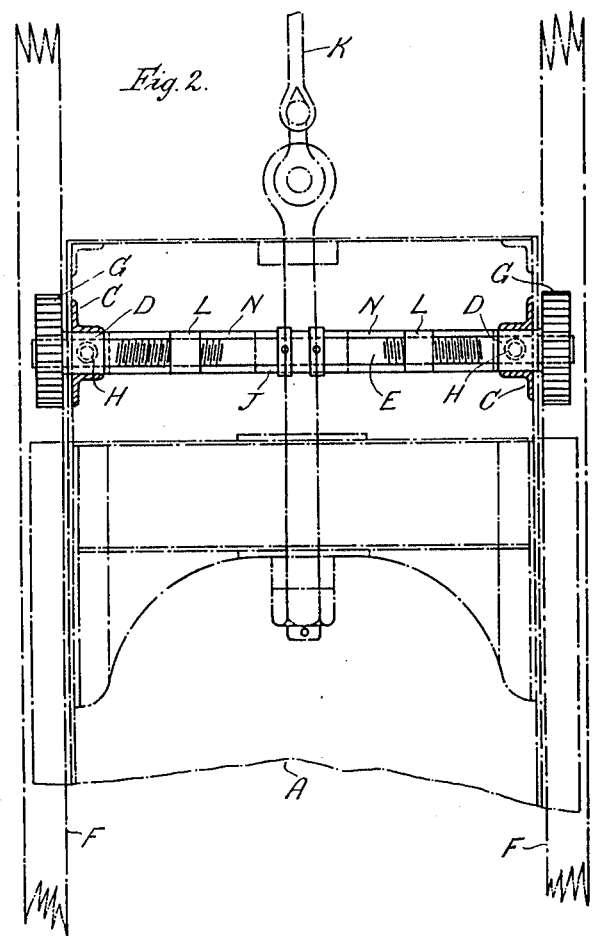

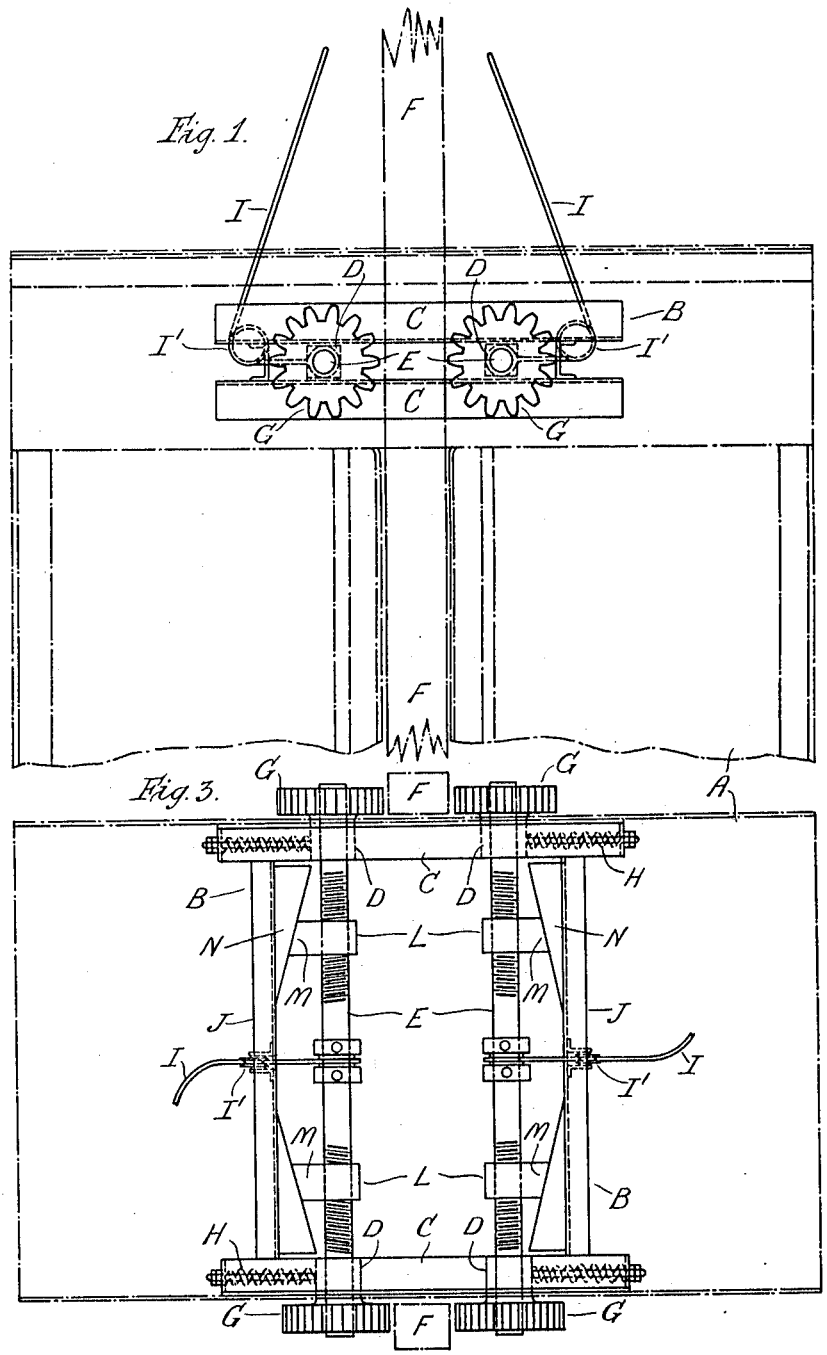

UNITED STATES PATENT OFFICE.

CHARLES DICKIE, FREDERICK LAMBERT, AND RICHARD STABLES, OF KIMBERLEY, SOUTH AFRICA.

SAFETY APPARATUS FOR SUPPORTING MINE-CAGES OR THE LIKE.

1,020,483.

Specification of Letters Patent.

Patented Mar. 19, 1912.

Application filed December 9, 1911. Serial No. 664,792.

*To all whom it may concern:*

Be it known that we, CHARLES DICKIE, FREDERICK LAMBERT, and RICHARD STABLES, subjects of the King of the United Kingdom of Great Britain and Ireland, and all residing at Kimberley, South Africa, have invented a certain new and useful Improvement in Safety Apparatus for Supporting Mine-Cages or the Like, of which the following is a specification.

This invention has for its object to provide an improved arrangement of devices whereby in the event of breakage of the hoisting rope of a mine cage or the like the cage may be effectually supported.

In the accompanying drawings Figure 1 is an elevation; Fig. 2 is a part elevation part vertical section at right angles to Fig. 1 and Fig. 3 is a plan showing part of a cage and means for supporting the same.

Referring to the drawings, disposed preferably at the upper end of a mine cage A, is a rectangular frame B the side members C of which are slotted to receive bearings D in which are journaled two parallel shafts E which are disposed on opposite sides of wooden or metal slides F and to each of which is keyed or otherwise fitted a pair of preferably toothed wheels G each adapted to engage a face of the corresponding slide F. The wheels G are normally held, against the action of adjustable springs H or the like, out of engagement with the corresponding slides F by means of wires I or the like, each wire being led around a pulley $I^1$ on a transverse member J of the frame B and secured at one end to the corresponding shaft E, it being understood that the other end of the wire I is secured to the winding rope K. The arrangement is such that when the winding rope K is under tension the wheels G are held clear of the slides F, but in case of breakage of the winding rope K and its consequent slackening, the said wires I will sag and permit the springs H to press the shafts E in the direction of the slides F so that the wheels G engaging the slides are caused to rotate and thereby rotate the said shafts E. Each shaft E has screw-threaded portions engaged by nuts L one inclined face M of each of which nuts engages a wedge-shaped block N, the blocks N being fixed to the transverse members J of the frame. Thus, by rotation of the shafts E, the nuts L are caused to mount the wedge-shaped blocks N and to force the shafts E positively in the direction of the slides F, causing the wheels G to bite into the latter. The extent of rotation of the shafts E is limited by the distance which the nuts L travel, so that when the cage A has fallen slightly the shafts E and the wheels G mounted thereon will be gradually stopped by the jamming of the nuts L, resulting finally in the suspension of the cage A from the said wheels G.

Having now described our invention what we claim and desire to secure by Letters Patent of the United States is:—

1. The combination with a vertically movable cage, of a hoisting rope for said cage, vertical slides between which said cage is movable, a frame carried by said cage, bearings slidable laterally in said frame, shafts journaled in said bearings on opposite sides of said slides, wheels on said shafts, means serving normally to hold said wheels away from said slides, and means including springs and wedge devices operable by said shafts for causing said wheels to engage positively with said slides.

2. The combination with a vertically movable cage, of a hoisting rope for said cage, vertical slides between which said cage is movable, a frame carried by said cage, bearings slidable laterally in said frame, shafts journaled in said bearings, wheels on said shafts, means serving normally to hold said wheels away from said slides, means tending to move said wheels toward said slides, and means including nuts adapted to travel on said shafts and members coöperating with said nuts for causing the wheels to engage positively with said slides.

3. The combination with a cage, of a hoisting rope, slides between which said cage is movable, a frame carried by said cage, bearings slidable laterally in said frame, screw-threaded shafts journaled in said bearings, wheels on said shafts, means serving normally to hold said wheels away from said slides, springs tending to move said wheels toward said slides, nuts in screw-threaded engagement with said shafts, and wedge devices coöperating with said nuts for
5 causing the wheels to engage positively with said slides and preventing rotation of said shafts.

In testimony whereof we have signed our names to this specification in the presence of two subscribing witnesses.

CHARLES DICKIE.
FRED. LAMBERT.
RICHARD STABLES.

Witnesses:
WILLIAM CRANSTON FAIRWEATHER,
JOHN McCLEARY.

Copies of this patent may be obtained for five cents each, by addressing the "Commissioner of Patents, Washington, D. C."